Figure 1:
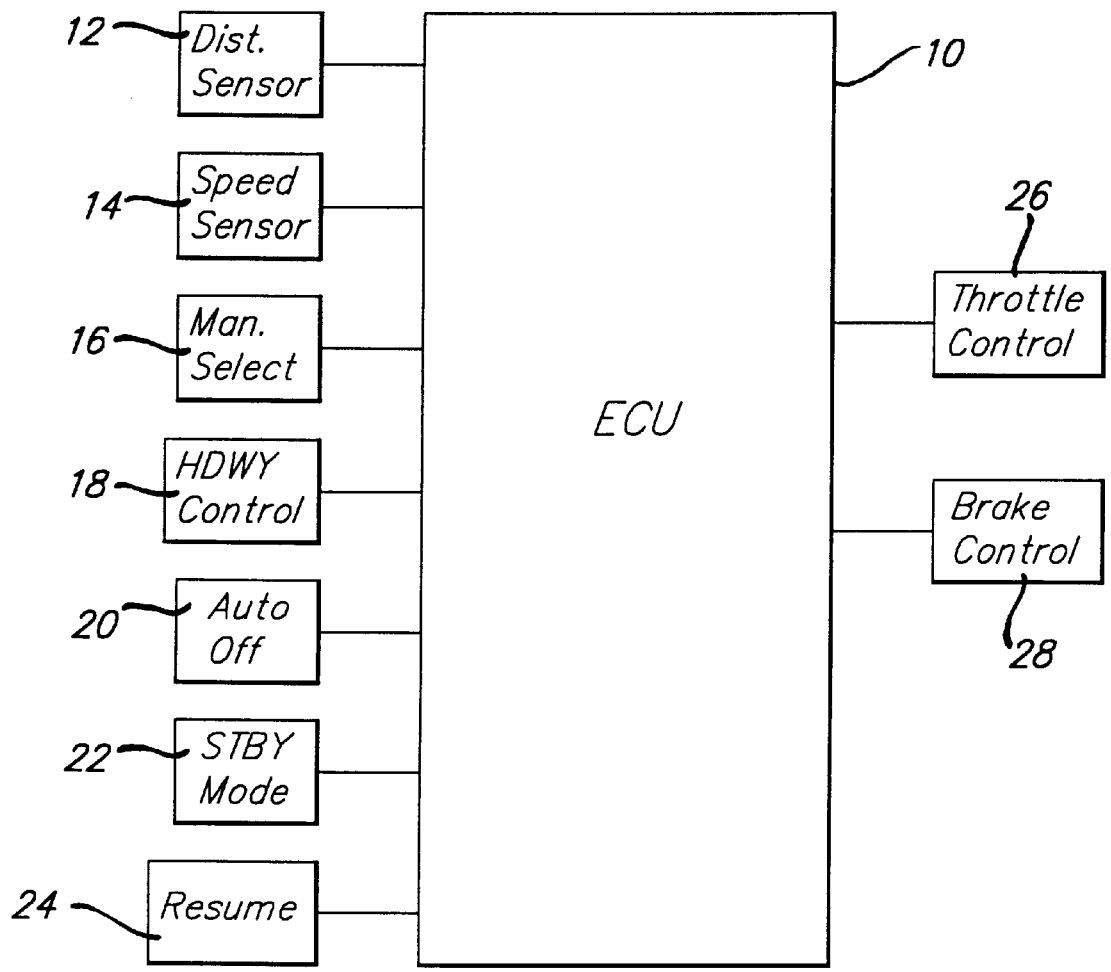

United States Patent [19]
Smith et al.

[11] Patent Number: 6,081,763
[45] Date of Patent: Jun. 27, 2000

[54] CRUISE CONTROL SYSTEM FOR MOTOR VEHICLES

[75] Inventors: Graeme Peter Smith, Bishops Stortford; Michael Julian Richardson, Redditch, both of United Kingdom

[73] Assignee: Jaguar Cars Limited, Allesley, United Kingdom

[21] Appl. No.: 08/825,162

[22] Filed: Mar. 26, 1997

[30] Foreign Application Priority Data

Mar. 26, 1996 [GB] United Kingdom .................. 9606381

[51] Int. Cl.$^7$ .................................................. B60K 31/00
[52] U.S. Cl. ................................................ 701/93; 701/96
[58] Field of Search .................................. 701/36, 41, 70, 701/93, 96, 301; 180/169, 170, 271; 340/435, 903

[56] References Cited

U.S. PATENT DOCUMENTS

| 5,014,200 | 5/1991 | Chundrlik et al. ......................... 701/96 |
| 5,173,859 | 12/1992 | Deering ...................................... 701/70 |
| 5,396,426 | 3/1995 | Hibino et al. . | |

FOREIGN PATENT DOCUMENTS

| 0 443 644 A1 | 8/1991 | European Pat. Off. . |
| 0 484 995 A2 | 5/1992 | European Pat. Off. . |
| 0720928A2 | 7/1996 | European Pat. Off. . |

*Primary Examiner*—William A. Cuchlinski, Jr.
*Assistant Examiner*—Edward Pipala
*Attorney, Agent, or Firm*—Paul K. Godwin

[57] ABSTRACT

Cruise control system for a vehicle includes a sensor for monitoring the speed of the vehicle, a sensor for monitoring the range of vehicles moving in front of the equipped vehicle, switch means for manually selecting a cruising speed, switch means for manually selecting a headway which controls the separation between the equipped vehicle and a vehicle moving in front of the equipped vehicle and means for switching the cruise control system on and off. The switch means for selecting the headway is manually adjustable between a minimum value and a maximum value. Automatic switch means is provided for switching the cruise control system off when the vehicle is stopped, the headway being automatically switched to a maximum value when the cruise control system is switched on.

14 Claims, 2 Drawing Sheets

CRUISE CONTROL SYSTEM FOR MOTOR VEHICLES

The present invention relates to cruise control systems for motor vehicles and in particular to cruise control systems including a distance sensor which permits the cruise control to maintain a comfortable distance with a vehicle in front of the equipped vehicle.

In conventional cruise control systems, the driver is able to select a speed at which he wishes the vehicle to travel and the cruise control system will then automatically control the vehicle to maintain the selected speed.

With systems of this type, in order to take account of other traffic and obstacles on the road, the cruise control system is disengaged by, for example, application of the brakes of the vehicle by the driver. The cruise control system has then to be reset, when the road is clear. Although this is not a significant problem when the traffic is light; in heavy traffic the driver is constantly disengaging and resetting the system to maintain a comfortable distance from the traffic in front. This presents a significant disincentive to use of the cruise control system in all but light traffic conditions.

This problem is overcome to a large extent by the addition of a distance sensor to the cruise control system. The distance sensor permits the cruise control system to control the vehicle so that it automatically maintains a comfortable distance between the equipped vehicle and vehicles moving in front of the equipped vehicle. With such systems, the driver inputs a set speed in the same way as he would for a conventional cruise control system and engages the system. The system will then control the vehicle to cruise at the set speed until another slower moving vehicle is detected in front of the equipped vehicle. The system will then operate on the throttle and brakes of the vehicle, to maintain a constant time based gap or headway to the vehicle in front. If the preceding vehicle is lost or increases speed to above that set by the driver of the equipped vehicle, then the cruise control system will automatically resume the set speed.

Commonly, with adaptive cruise control systems as described above, the headway is controlled by the cruise control system on the basis of a predetermined calibrated scale dependent on vehicle speed. This takes no account of road conditions or driver preferences.

It has consequently been proposed, for example in EP-A-0,443,644 and U.S. Pat. No. 5,173,859, to provide an adaptive control system in which the driver is able to set both a cruising speed and a headway control by which the driver can control the headway to suit road conditions and/or his reaction times.

In accordance with EP-A-0,443,644 the headway control may be variable to represent a driver reaction time varying from 0.3 to 1.75 seconds. The headway control may be infinitely variable between upper and lower limits although more likely is variable in increments, the position of the setting device giving an indication of the selected headway.

As different drivers will have different preferences, where a vehicle is to be driven by different drivers and the cruise control system when initiated goes to the headway selected by the previous driver, it may be quite disconcerting to a new driver, if he is expecting a relatively large inter-vehicle distance and the system operates with a relative short inter-vehicle distance, because the headway control has been left at a small value.

According to one aspect of the present invention a cruise control system for a vehicle comprises; means for monitoring the speed of the vehicle; means for monitoring the range of vehicles moving in front of the equipped vehicle; means for manually selecting a cruising speed; means for manually selecting a headway which controls the separation between the equipped vehicle and a vehicle moving in front of the equipped vehicle, the means for selecting the headway being manually adjustable between a minimum value and a maximum value; means for switching the cruise control system on and off; automatic means for switching the cruise control system off when the vehicle is stopped and means for resetting the headway to its maximum value when the cruise control system is switched on.

With the cruise control system according to the present invention, whenever the system is switched on, the headway control will default to its maximum value. The driver may then reselect a desired headway to suit the road conditions and/or his preferences.

In accordance with a preferred embodiment of the invention, the headway control comprises a rocker switch with a plurality of detent positions, each detent position corresponding to a particular headway setting. The switch may thus be moved from a first detent position to an "n"th detent position, the switch being maintained in the selected position by suitable detent means. The first detent position represents the maximum headway setting, the headway setting decreasing incrementally to the "n"th detent position. The switch also has contacts which are engageable by movement of the rocker from the first detent position in a direction away from the second detent position, engagement of said contacts switching the cruise control system on.

With the rocker switch disclosed above, in order to switch the cruise control system on, the rocker switch must first be returned to its first detent position, thereby setting the headway control to its maximum setting.

In an alternative embodiment, separate switches may be provided to switch the cruise control system on and off and to select the headway, interlock means being provided so that when said one switch is actuated to switch the system on, it releases the headway selection switch permitting it to return to a position in which the maximum headway is selected.

Alternatively, the distance control may be reset electronically to the maximum headway when the cruise control system is switched off, on stopping of the vehicle, or when the cruise control system is switched on again. With such a system, the means for indicating the selected headway will also be electronically controlled, so that it may also be reset electronically.

An embodiment of the invention is now described, by way of example only, with reference to the accompanying drawings, in which:

FIG. 1 is a block diagram of a cruise control system in accordance with the present invention; and FIGS. 2A to 2D represent a rocker switch used in the cruise control system illustrated in FIG. 1, the rocker switch being illustrated in various positions.

As illustrated in FIG. 1, a cruise control system comprises an ECU 10. A distance sensor 12 which may comprise of radar or laser system, is located so that it monitors the path in front of the equipped vehicle and provides signals to the ECU indicative of the speed and range of vehicles moving in front of the equipped vehicle. A vehicle speed sensor 14 provides signals to the ECU 10 corresponding to the speed of the equipped vehicle.

A manually operable cruising speed selection control 16 provides signals to the ECU by which the driver may control the cruising speed of the vehicle. The cruising speed selection control 16 may comprise a setting switch which the driver may actuate when the vehicle is travelling at the desired speed, after which the cruise control system will automatically hold that speed, provided that no slower moving vehicles are in front of the equipped vehicle. Alternatively the cruising speed selection control 16 may comprise an infinitely variable or incrementally adjustable switch by which the required speed may be set. Provision may also be made by which the cruising speed may be increased or decreased incrementally. Preferably, the cruising speed selection control 16 also includes means for providing an indication of the selected speed.

A headway selection control and on/off switch 18 provides signals to the ECU 10 which may be controlled by the driver, to switch the cruise control system on and off and to select the headway, that is a time based distance between the equipped vehicle and the vehicles in front of the equipped vehicle, which will permit the ECU 10 to control the speed of the equipped vehicle to maintain a comfortable distance between the equipped vehicle and vehicles travelling in front of the equipped vehicle.

Figure 2A:
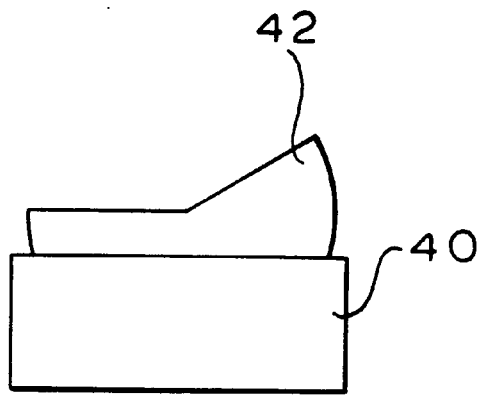
Figure 2B:
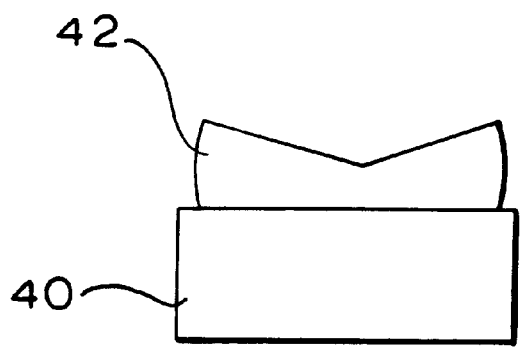
Figure 2C:
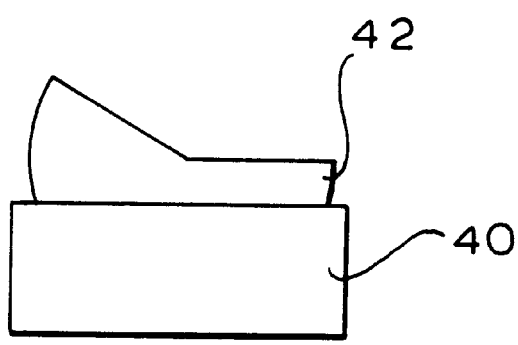

As illustrated in FIGS. 2A to 2D, the headway selection control and on/off switch 18 comprises a rocker switch 40, the rocker 42 being movable from a first detent position as illustrated in FIG. 2A, to a second detent position as illustrated in 2B, to a third detent position illustrated in FIG. 2C. The rocker 42 is maintained in each of its detent positions, by suitable detent means. When the rocker 42 is in the first detent position, the ECU 10 is switched to select a maximum headway setting of say 2.5 seconds; when the rocker 42 is in the second detent position, the ECU 10 is switched to select an intermediate headway setting of say 1.8 seconds; and when the rocker 42 is in the third detent position, the ECU 10 is switched to select a minimum headway setting of say 1.2 seconds.

Figure 2D:
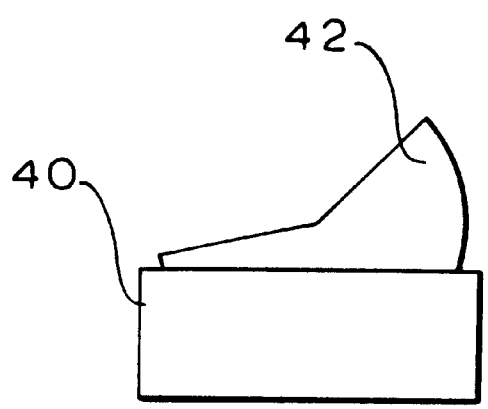

From its first position, the rocker 42 may be depressed in an anticlockwise direction, against resilient biasing means, to the position illustrated in FIG. 2D, to manually switch the cruise control system on and off.

An off control 20 provides a signal to the ECU 10 to automatically switch the cruise control system off. The off control 20 may provide the signal to switch the cruise control system off, when the ignition system of the vehicle is switched off or the vehicle is stopped and switch means indicates that the driver has left his seat, or a door of the vehicle has been opened.

Switch means 22 may also be provided to cause the ECU 10 to go from a cruise control mode into a standby mode when, for example, a cancel switch is actuated, the brakes are applied by the driver, the gear selector is moved to neutral or a door of the vehicle is opened. A resume switch 24 permits the ECU 10 to be switched from the standby mode to the cruise control mode, without having to reset the system.

The ECU 10 controls a throttle control module 26 and brake control module 28 to control the speed of the vehicle to the desired cruising speed and to maintain a comfortable distance with the vehicle in front of the equipped vehicle, the comfortable distance being based on the headway selected by the driver.

With the cruise control system described above, the driver must first switch the system on by pressing the rocker 42 of switch 40 from the first detent position illustrated in FIG. 2A, to the position illustrated in FIG. 2D. Upon release of the rocker 42, the biasing means will return it to the first detent position in which the headway is set to a maximum. The driver may then select the cruising speed required by means of control 16 and, if he wishes to reduce the headway, may move the rocker 42 of switch 40 to the detent positions illustrated in either FIG. 2B or 2C.

The cruise control system will then control the vehicle by adjusting the throttle and/or brake by means of modules 26 and 28 to maintain the set cruising speed until the distance sensor 12 detects a slower moving vehicle in front of the equipped vehicle. The cruise control system will then control the speed of the vehicle by means of modules 26 and 28, to maintain the headway set by the driver.

If while the vehicle is under control of the cruise control system the driver engages the brakes or engages neutral, switch 22 will cause the cruise control system to go to standby, so that the speed of the vehicle may then be controlled by the driver. The cruise control system may then resume control when the switch 24 is actuated.

The driver may switch the cruise control system off by moving rocker 42 of switch 40 back to the position illustrated in FIG. 2D.

The cruise control system is automatically switched off by switch means 20, when the ignition is switched off or the vehicle is stopped and the driver leaves the vehicle.

Even if the rocker 42 of switch 40 is left in either of the positions illustrated in FIG. 2B or 2C when the driver leaves the vehicle, in order to switch the cruise control system back on, the rocker 42 must first be returned to the first detent position illustrated in FIG. 2A which represents the maximum headway setting, before the cruise control system can be switched on again. A new driver may then set the headway to suit his own requirements as described above.

What is claimed is:

1. A cruise control system for a vehicle comprising; means for monitoring the speed of the vehicle; means for monitoring the range of vehicles moving in front of the equipped vehicle; means for manually selecting a cruising speed; means for manually selecting a headway which controls the separation between the equipped vehicle and a vehicle moving in front of the equipped vehicle, the means for selecting the headway being manually adjustable between a minimum value and a maximum value; means for switching the cruise control system on and off; automatic means for switching the cruise control system off when the vehicle is stopped and means for resetting the headway to its maximum value when the cruise control system is switched on.

2. A cruise control system according to claim 1 in which the means for monitoring the range of vehicles moving in front of the equipped vehicle comprises a radar or laser system.

3. A cruise control system according to claim 1 in which the means for manually selecting a cruising speed comprises switch means which is actuated when the vehicle is travelling at the desired speed.

4. A cruise control system according to claim 1 in which the means for manually selecting the cruising speed comprises an infinitely variable or incrementally adjustable switch means.

5. A cruise control system according to claim 1 in which the set cruising speed may be incrementally increased or decreased.

6. A cruise control system according to claim 1 in which single switch means is provided to select the headway and to switch the cruise control system on and off.

7. A cruise control system according to claim 6 in which the switch means comprises a rocker switch with a plurality of detent positions, headway setting decreasing from the first detent position to the nth detent position.

8. A cruise control system according to claim 7 in which the rocker switch is movable from the first detent position away from the second detent position, to an on/off position in which the cruise control system is switched on or off.

9. A cruise control system according to claim 8 in which the rocker switch is resiliently biased from the on/off position to the first detent position.

10. A cruise control system according to claim 1 in which means is provided for automatically switching the cruise control system off when the vehicle ignition system is switched off.

11. A cruise control system according to claim 1 in which means is provided for automatically switching the cruise control system off when the driver leaves the vehicle.

12. A cruise control system according to claim 11 in which means is provided for automatically switching the cruise control system off when the vehicle is stopped and switch means indicates that the driver has left his seat or a door of the vehicle has been opened.

13. A cruise control system according to claim 1 in which switch means is provided to switch the control system to standby mode when at least one of the following events occurs: brakes are applied, neutral gear is selected or a door is opened, while the cruise control system is in operation.

14. A cruise control system according to claim 13 in which switch means is provided to resume cruise control mode from the standby mode.

* * * * *